(12) United States Patent
Irwin

(10) Patent No.: US 7,131,360 B2
(45) Date of Patent: Nov. 7, 2006

(54) THERMOFORMING TRIM PRESS HAVING ADJUSTABLE BUSHING ASSEMBLY, TRIM TOOL GUIDE ASSEMBLY, AND METHOD

(76) Inventor: Jere F. Irwin, P.O. Box 10668, Yakima, WA (US) 98909-1668

( * ) Notice: Subject to any disclaimer, the term of this patent is extended or adjusted under 35 U.S.C. 154(b) by 36 days.

(21) Appl. No.: 11/055,395

(22) Filed: Feb. 9, 2005

(65) Prior Publication Data

US 2005/0172768 A1    Aug. 11, 2005

Related U.S. Application Data

(60) Provisional application No. 60/543,456, filed on Feb. 9, 2004.

(51) Int. Cl.
*B26D 5/08*    (2006.01)
*B26D 1/00*    (2006.01)
*B26D 5/00*    (2006.01)
*B30B 1/32*    (2006.01)

(52) U.S. Cl. .............................. 83/13; 83/615; 83/821; 83/824; 83/684; 29/465; 100/269.17; 100/269.18; 100/269.21

(58) Field of Classification Search ................. 83/821, 83/824, 635; 100/269.17
See application file for complete search history.

(56) References Cited

U.S. PATENT DOCUMENTS

| 3,763,732 A | * | 10/1973 | Stursberg | 83/635 |
| 6,067,886 A | | 5/2000 | Irwin | 83/615 |
| 6,116,133 A | * | 9/2000 | Nishida | 83/686 |

* cited by examiner

*Primary Examiner*—Derris H. Banks
*Assistant Examiner*—Sean M. Michalski
(74) *Attorney, Agent, or Firm*—Wells St. John P.S.

(57) ABSTRACT

A thermoforming trim press is provided with a frame, a punch plate, a die plate, and a bushing. The frame has a guide post including a tapered outer surface with increasing cross-sectional dimension toward a closing position. The punch plate has a male cutting die. The die plate has a female cutting die configured to scissor in intermeshing relation with the male cutting die. The bushing has a tapered inner surface complementary and reverse to the tapered outer surface of the guide post. The bushing is adjustable in cross-sectional dimension and is configured to guide one of the punch plate and the die plate for axial reciprocation along the guide post. A method is also provided.

28 Claims, 19 Drawing Sheets

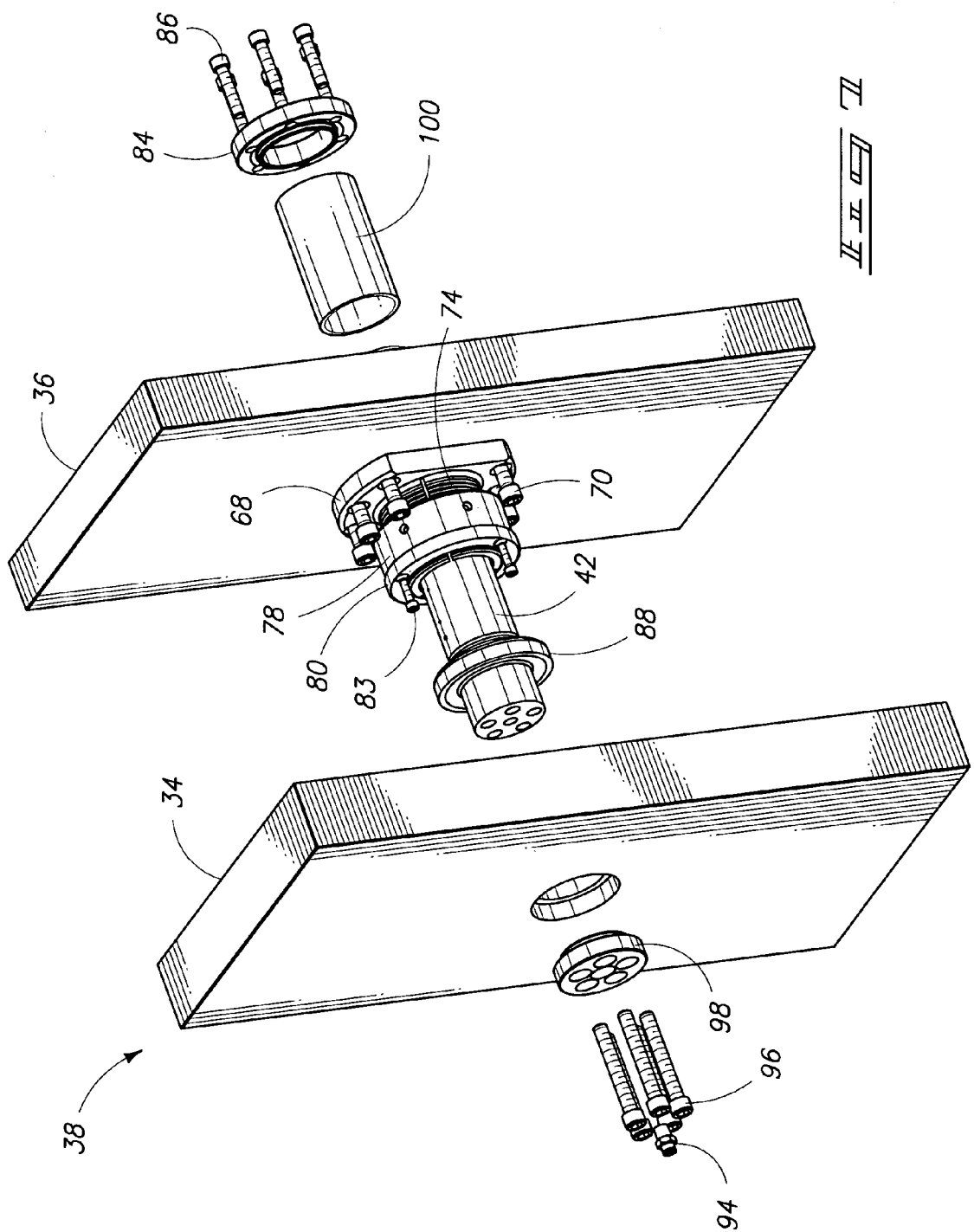

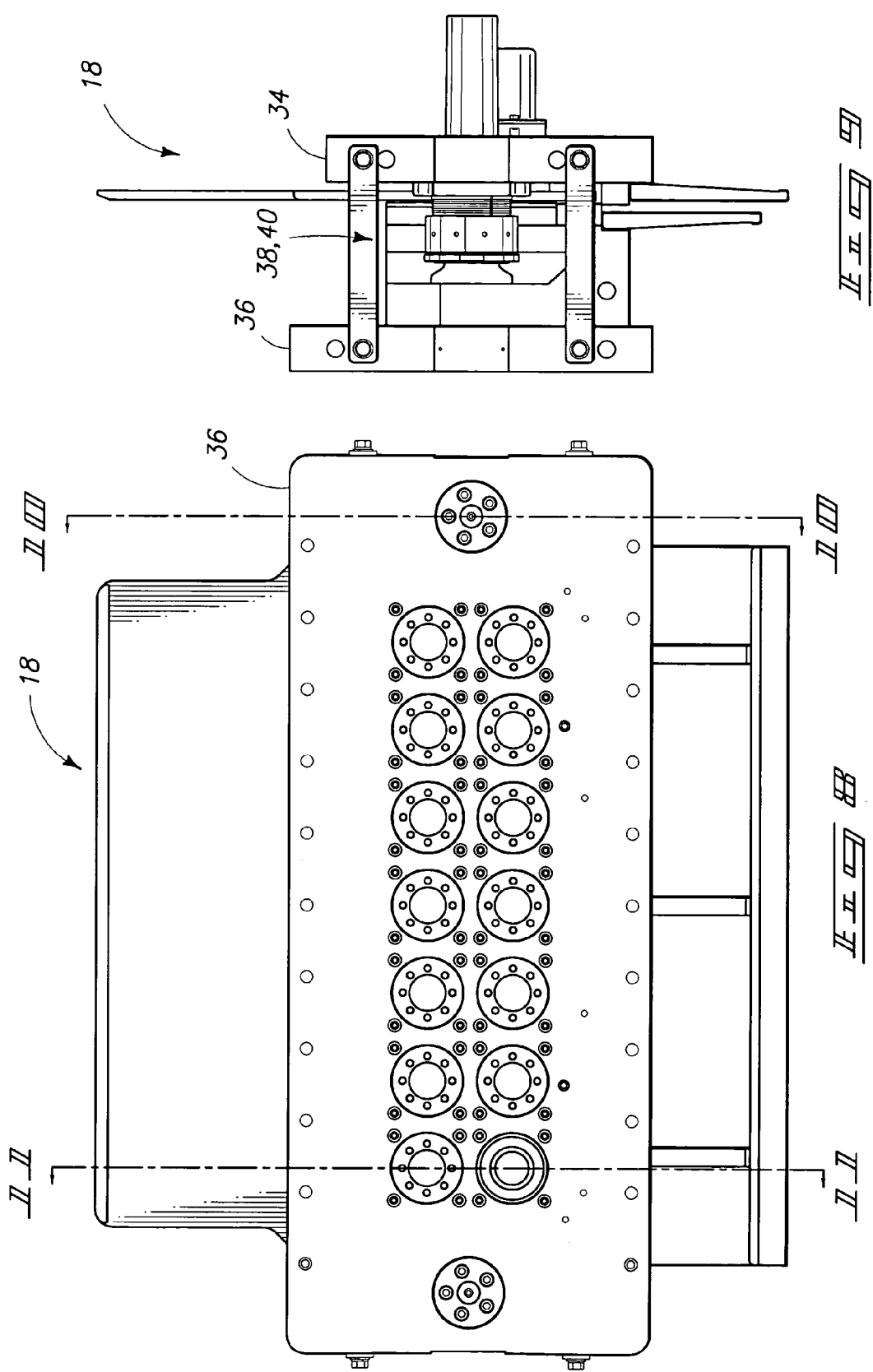

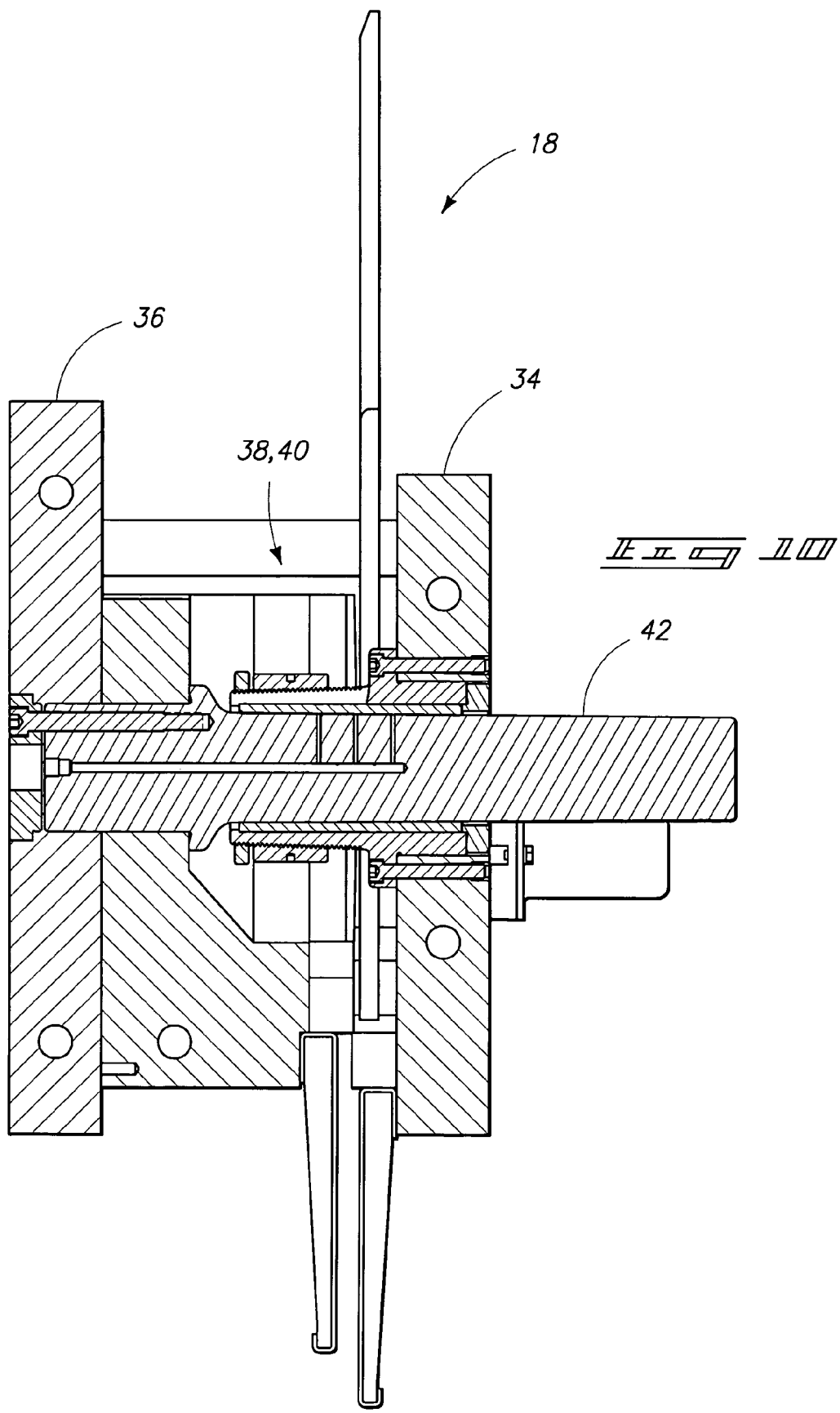

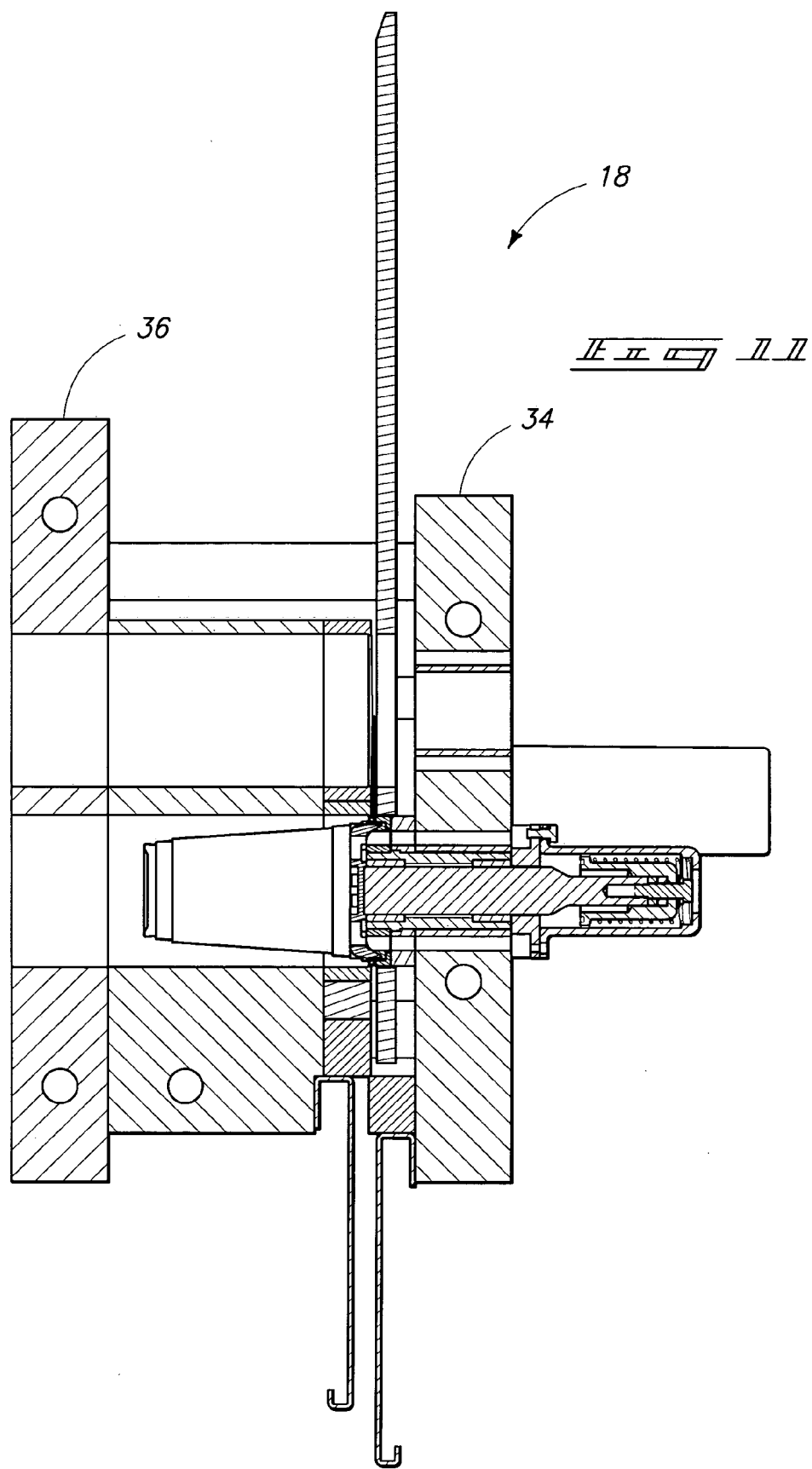

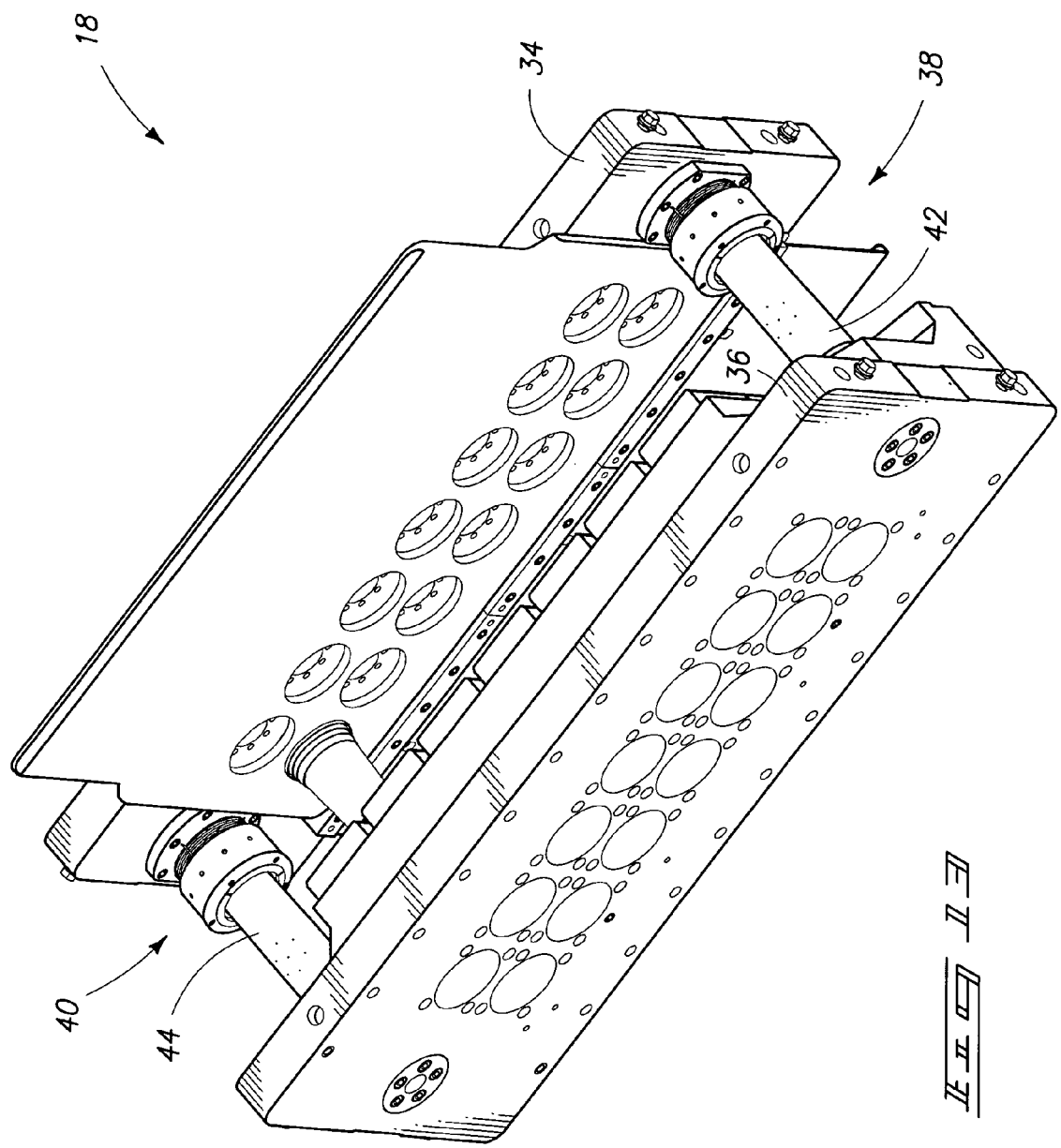

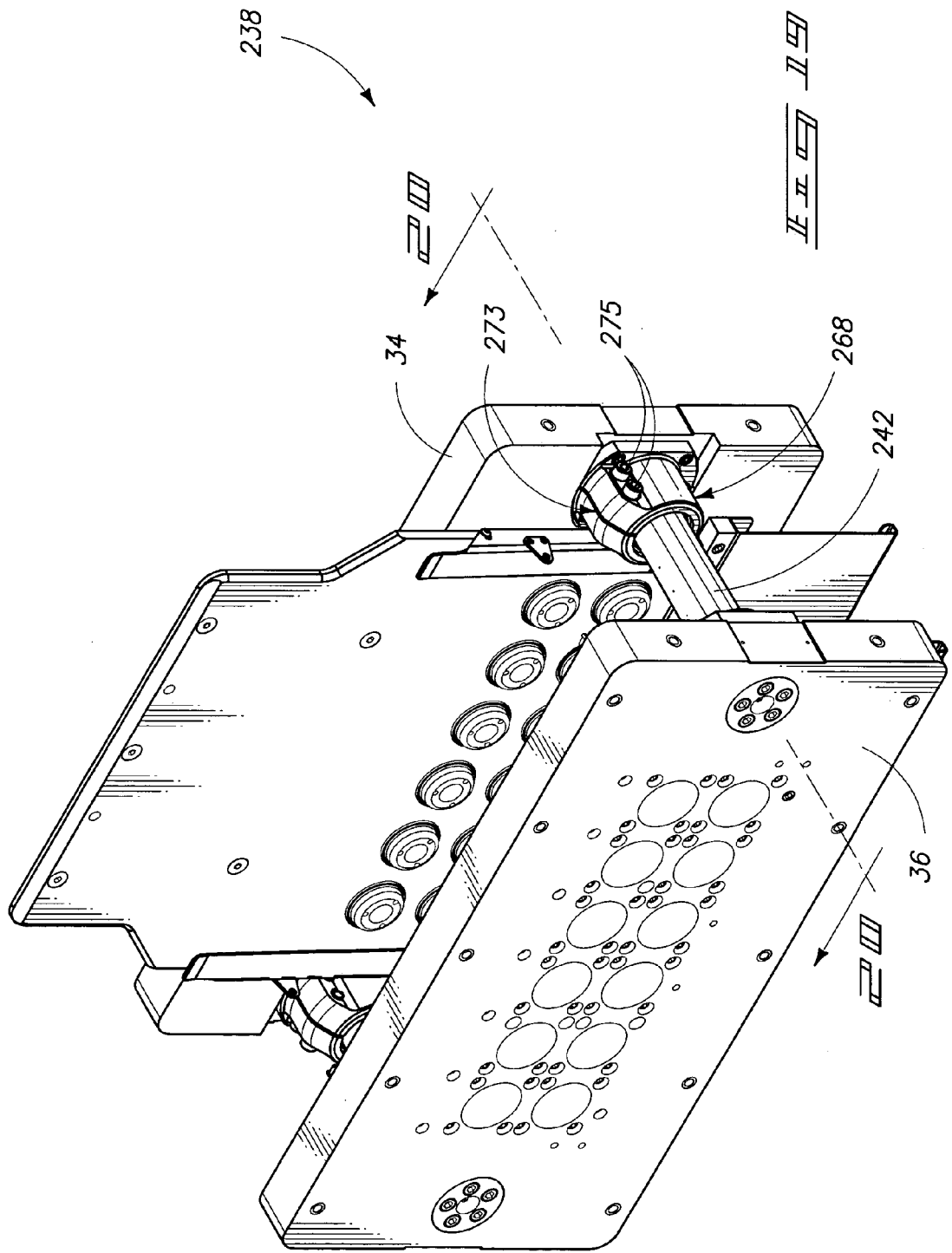

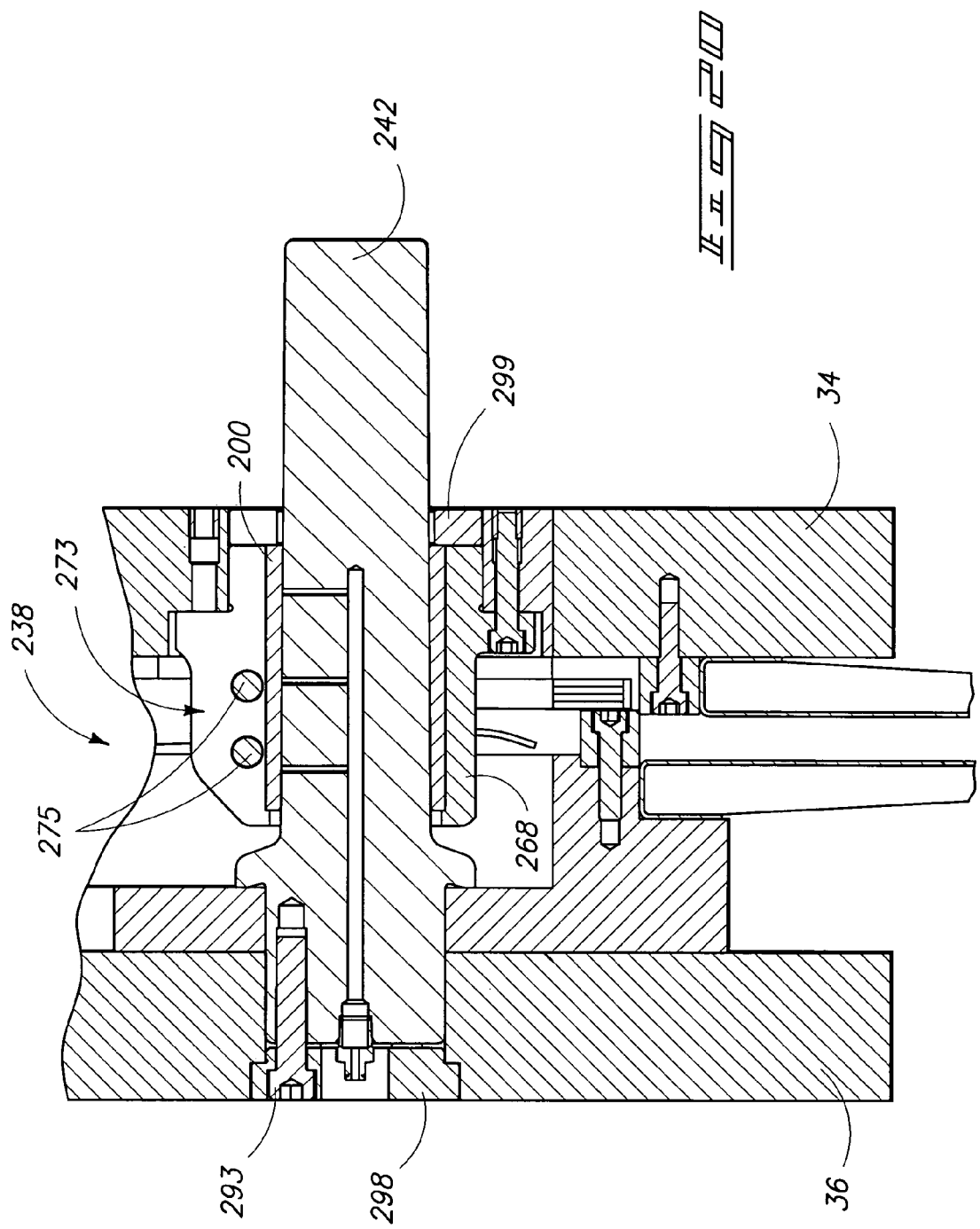

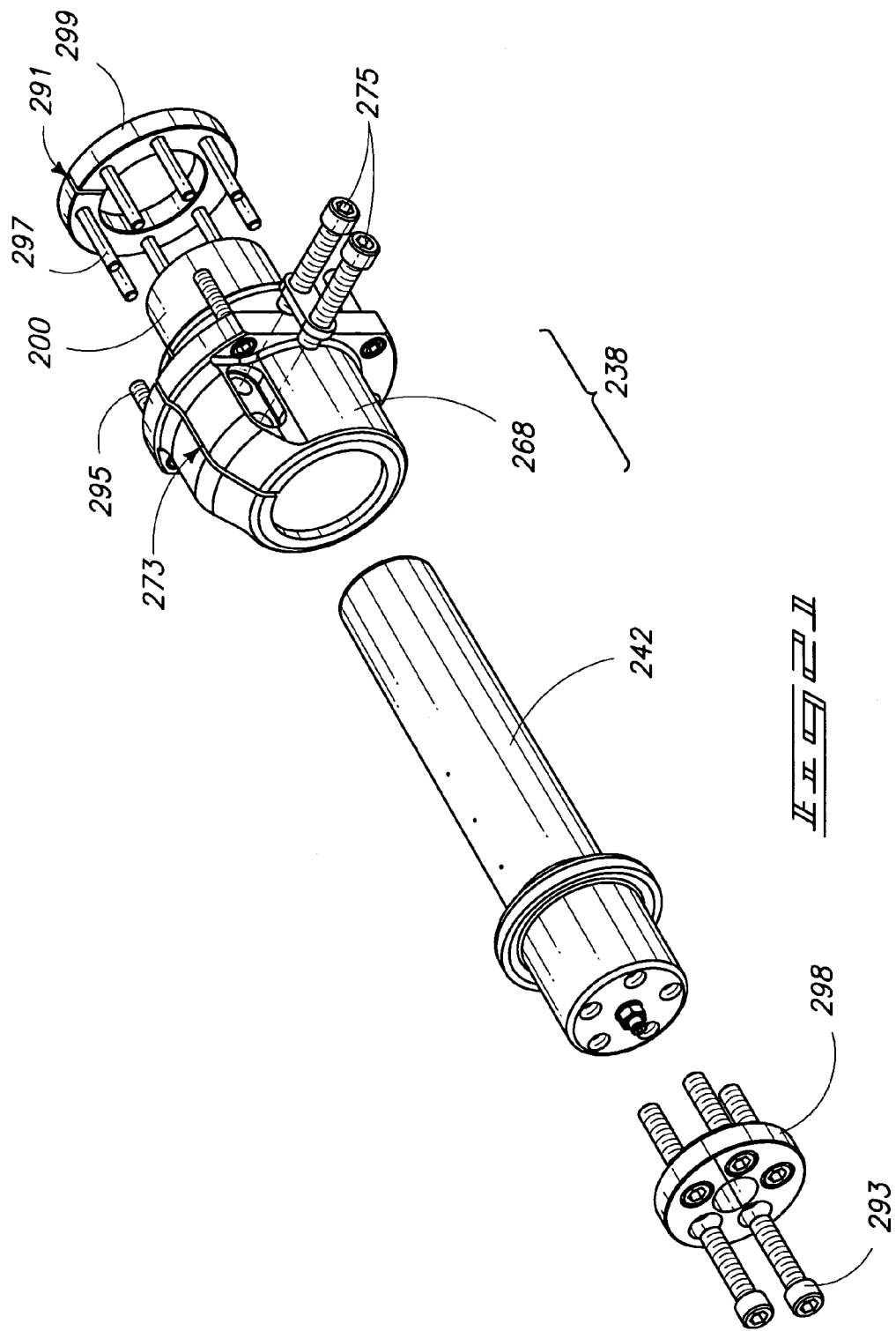

THERMOFORMING TRIM PRESS HAVING ADJUSTABLE BUSHING ASSEMBLY, TRIM TOOL GUIDE ASSEMBLY, AND METHOD

CROSS-REFERENCE TO RELATED APPLICATIONS

This patent application claims the benefit of U.S. Provisional Patent Application Ser. No. 60/543,456, filed Feb. 9, 2004, entitled "Adjustable Thermoforming Trim Press Alignment System and Structure", naming as inventor Jere F. Irwin., and which is incorporated by reference herein.

TECHNICAL FIELD

This invention pertains to apparatus and methods for severing thermoformed plastic articles from a sheet of plastic thermoformable material. More particularly, the present invention relates to platen posts, tool die posts and bushing assemblies for a thermoforming trim press.

BACKGROUND OF THE INVENTION

When severing thermoformed articles from a web of plastic material, there exists a need to ensure accurate coaction between male and female cutting dies in order to ensure accurate part removal, as well as to enhance maximum operating speeds of a thermoforming trim press. Accurate tolerancing and tight fit-up between moving components ensures accurate severing of articles so that flanges along a trim edge are uniform and precise. However, small tolerances between sliding parts and accurate fit-up can also result in increased working loads when stroking a trim press platen or die along a die post (or guide post). Accordingly, improvements are needed in the manner in which moving members of a trim press are axially guided and fitted for coaction during a cyclical article severing operation.

SUMMARY OF THE INVENTION

An improved platen die set and an improved trim tool die set are each provided for a thermoforming trim press with an adjustable bushing assembly. A tapered bushing is mated in complementary relation with a tapered die post for the platen die set as well as the trim tool die set. The taper on each die post decreases in diameter and in an opposite direction that the taper on an inner surface of the bushing increases. Hence, the bushing conforms with the taper on the die post. Adjustable bushing assemblies enable controlled compression of a bronze bushing onto the tapered die posts so that a tight fit-up is presented at the position of maximum stroke corresponding with a position where an article is severed from a web of thermoformed material. As the trim tool dies are moved apart and as the platens are also moved apart, the taper provides a relatively looser fit as the platens and the dies separate, which reduces friction between the moving die and platen, and the respective die post during most of the stroke cycle. However, by adjusting the corresponding bushing assemblies, a snug fit-up is provided between the bushing and the tapered die post at the corresponding positions of maximum displacement which correspond with the position at which an article is being severed. Accordingly, an accurate severing operation is provided while reducing frictional forces during the remaining portions of stroke that occur between the platen and its die post, as well as the male punch plate (or trim tool) and its corresponding die post.

According to one aspect, a thermoforming trim press is provided with a frame, a punch plate, a die plate, and a bushing. The frame has a guide post including a tapered outer surface with increasing cross-sectional dimension toward a closing position. The punch plate has a male cutting die. The die plate has a female cutting die configured to scissor in intermeshing relation with the male cutting die. The bushing has a tapered inner surface complementary and reverse to the tapered outer surface of the guide post. The bushing is adjustable in cross-sectional dimension and is configured to guide one of the punch plate and the die plate for axial reciprocation along the guide post.

According to another aspect, a trim tool guide assembly is provided for a thermoforming trim press. The trim tool guide assembly includes a guide post and a bushing assembly. The guide post has a forward-tapered outer circumferential dimension. The bushing assembly has a bushing with a reverse-tapered inner circumferential dimension and an adjustable support collar for retaining the bushing assembly and adjusting the inner circumferential dimension of the bushing relative to the outer circumferential dimension of the guide post.

According to yet another aspect, a method is provided for accurately severing an article from a web of thermoformed material using a thermoforming trim press. The method includes: providing a trim press with a guide post having a tapered outer surface that increases in cross-sectional dimension toward a closing position, a punch plate with a male cutting die, a die plate with a female cutting die configured to scissor with the male cutting die, and a bushing adjustable in cross-sectional dimension and having a tapered inner surface complementary and reverse to the tapered outer surface of the guide post; positioning the male cutting die in intermeshing relation with the female cutting die proximate the closing position; and concurrent with positioning, adjusting cross-sectional dimension of the bushing to realize a desired accurate fit-up between the bushing and the guide post.

BRIEF DESCRIPTION OF THE DRAWINGS

Preferred embodiments of the invention are described below with reference to the following accompanying drawings.

FIG. 7 is a partial exploded perspective view of the one alternative construction alignment structure of FIGS. 5–6 for use with the trim tool die posts.

FIG. 8 is a plan view of the trim tool die assembly used within the trim press and corresponding with the end view of the alignment structure for the trim tool die post of FIGS. 5–7.

FIG. 9 is a side view of the trim tool die assembly of FIG. 8.

FIG. 10 is a cross-sectional view of the trim tool die assembly taken along line 10—10 of FIG. 8.

FIG. 13 is an isometric view corresponding with the view taken in FIG. 12 of the trim tool die assembly, but illustrating separation between the male and female die members.

FIG. 14 is a vertical centerline sectional view of the bronze bushing used within the alignment structure of FIGS. 5–14.

FIG. 19 is a simplified perspective view of a second alternative construction for an alignment structure for a trim tool die post over the two embodiments depicted in FIGS. 1–18.

FIG. 20 is a sectional view taken along lines 20—20 of FIG. 19 and illustrating the alternative construction for the alignment structure of FIG. 19.

FIG. 21 is a simplified, partial exploded perspective view of the alternative construction for an alignment structure of FIGS. 19–20.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
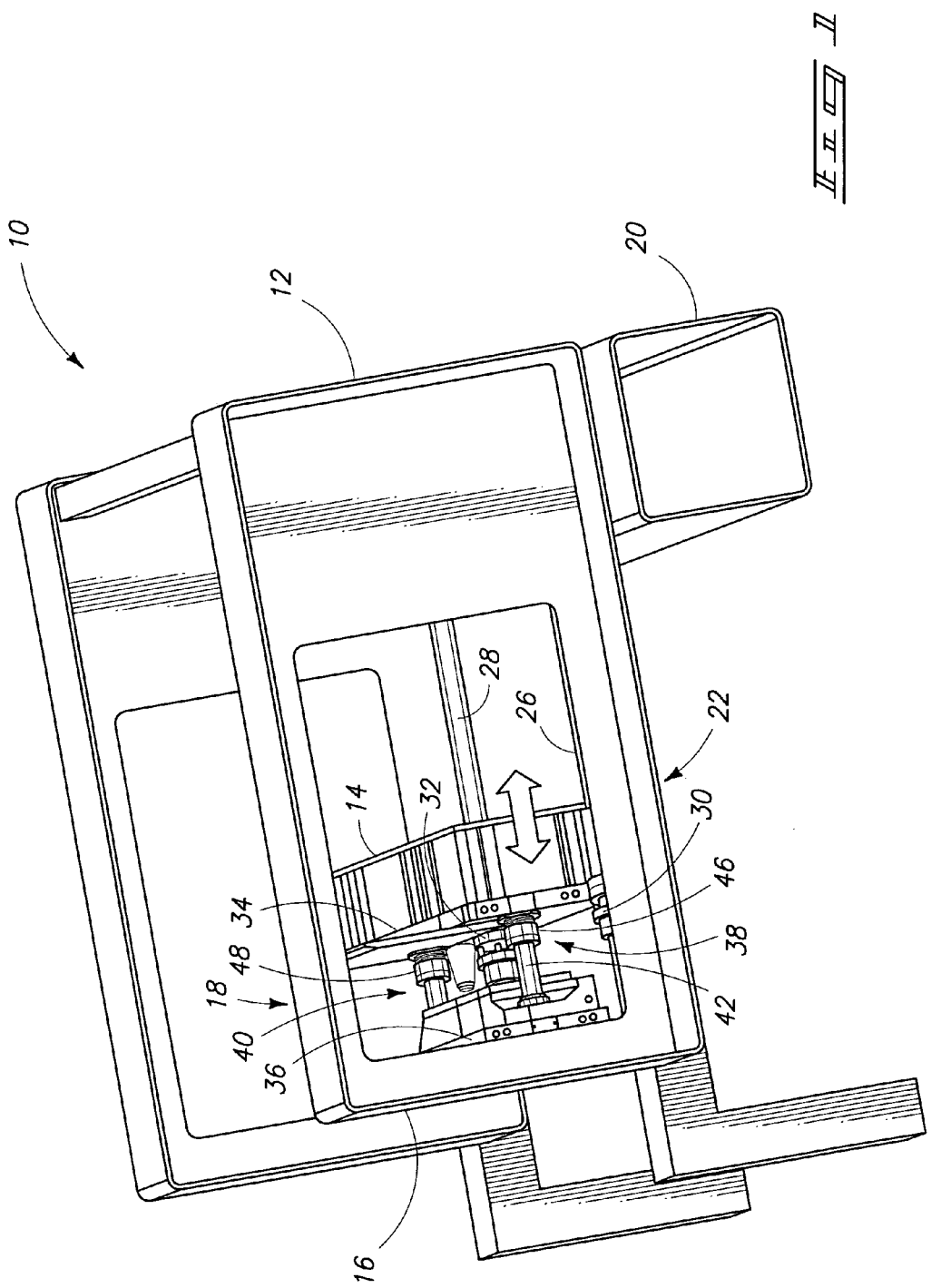
FIG. 1 is a simplified schematic perspective view of a machine trim press having alignment and guide features in accordance with the preferred embodiment of the invention.

A preferred embodiment of an improved machine trim press is generally designated with reference numeral 10 in FIG. 1. Trim press 10 includes a frame 12 that supports a moving platen 14 and a stationary platen 16. A trim tool assembly 18 is mounted between moving platen 14 and stationary platen 16.

Frame 12 includes a base 20 comprising a ballast tank in which ballast material is placed to stabilize frame 12 while trim press 10 is cycled in operation. For example, gravel can be placed inside base 20.

It is understood that trim press 10 is shown in simplified form in order to prevent obscuring the invention at hand. More particularly, trim press 10 comprises one of a number of thermoforming trim press constructions. One exemplary construction is disclosed in U.S. Pat. No. 6,067,886, herein incorporated by reference, having counterbalanced crank arm assemblies configured to drive a moving platen in reciprocation. The commercial version of this trim press is available from Irwin Research and Development, of Yakima, Wash., Model No. 44 Vertical Trim Station (VTS). Such a trim press supports moving platen 14 on a pair of die posts, such as die posts 26 and 28, with four counterbalanced crank arm assemblies. Hence, four counterbalanced kinematic linkages (not shown) drive each corner of moving platen 14 within frame 12. Details of the kinematic linkages that oscillate platen 14 along die posts 26 and 28 are not shown in FIGS. 1 and 2 in order to simplify the drawings and not obscure the invention at hand. However, any of a number of techniques presently known in the field for driving a moving platen to and fro can be utilized to drive trim press 10 and can benefit from the improvements presented by the present invention.

A pair of adjustable platen die sets 22 and 24 provide for adjustable sliding fit-up and engagement of moving platen 14 relative to die posts 26 and 28. More particularly, die posts 26 and 28 are tapered such that each die post has a larger diameter when platen 14 is moved into engagement with stationary platen 16 during a severing operation. According to one construction, each die post 26 and 28 decreases in diameter by $1.5/1000$ths of an inch for each inch of length along the respective posts 26 and 28. Accordingly, fit-up in the platen die sets 22 and 24 increases the snugness therebetween as the platen 14 is moved into engagement with platen 16. As platen 16 moves away from platen 14, fit-up loosens, which provides for less friction when moving platen 14. However, the taper in die posts 26 and 28 ensures that there exists accurate and tight fit-up between the platen die sets 22 and 24 as platens 14 and 16 come together during a severing operation. It is during the severing operation (closest positioning between the platens) that precise fit-up is most needed in order to maintain accurate severing of articles from a web of thermoformable material (not shown).

In operation, trim press 10 receives a web of thermoformable plastic material in which an array of cups has been previously formed within a thermoforming machine (not shown). The web is intermittently fed between moving platen 14 and stationary platen 16 by a conveyor (not shown) which intermittently progresses the web through a molding machine where articles are formed in the web, and into position between trim press platens 14 and 16 where the articles are severed from the web. Trim tool assembly 18 includes male and female cutting members in respective punch plates 34 and die plates 36 that coact to sever articles from the web.

Each platen die set 22 and 24 includes an adjustable bushing assembly 30 and 32, respectively. Adjustable bushing assemblies 30 and 32 can be tightened to ensure that each bushing assembly 30 and 32 remains tight about tapered die posts 26 and 28 when moving platen 14 is positioned at a fully extended position towards stationary platen 16. Accordingly, as bushings within bushing assemblies 30 and 32 wear, the bushings can be tightened by adjusting bushing assembly 30 and 32 in order to maintain accurate alignment along tapered die posts 26 and 28.

Trim tool assembly 18 includes a plurality of punches that are provided within a male punch plate 34 and a plurality of dies provided within a female die plate 36. Male punch plate 34 is rigidly affixed to moving platen 14, whereas female die plate 36 is rigidly affixed to stationary platen 16. Accordingly, male punch plate 34 moves in reciprocation with moving platen 14 by way of kinematic linkages (not shown) that drive moving platen 14 to and fro along tapered die posts 26 and 28. Additionally, a pair of trim tool die sets 38 and 40 provide for alignment between male punch plate 34 and female die plate 36. Trim tool die sets 38 and 40 are somewhat similar in construction to platen die sets 22 and 24. The adjustable bushing assemblies 30, 32 and 46, 48 are likewise similar in operation and set-up.

Trim tool die sets 38 and 40 each have a tapered trim tool die post 42 and 44, respectively. Each trim tool die post increases in diameter as the male punch plate and the female die plate are brought together, and taper in decreasing diameter as the male punch plate 34 and female die plate 36 are brought apart. Preferably, respective trim tool die posts 42 and 44 are tapered to decrease in diameter by $15/1000$ths of an inch for each axial inch of length along posts 32 and 34. Other alternative constructions are also possible. An adjustable bushing assembly 46 and 48 has a complementary internal surface taper that substantially complements the taper on posts 42 and 44.

Figure 2:
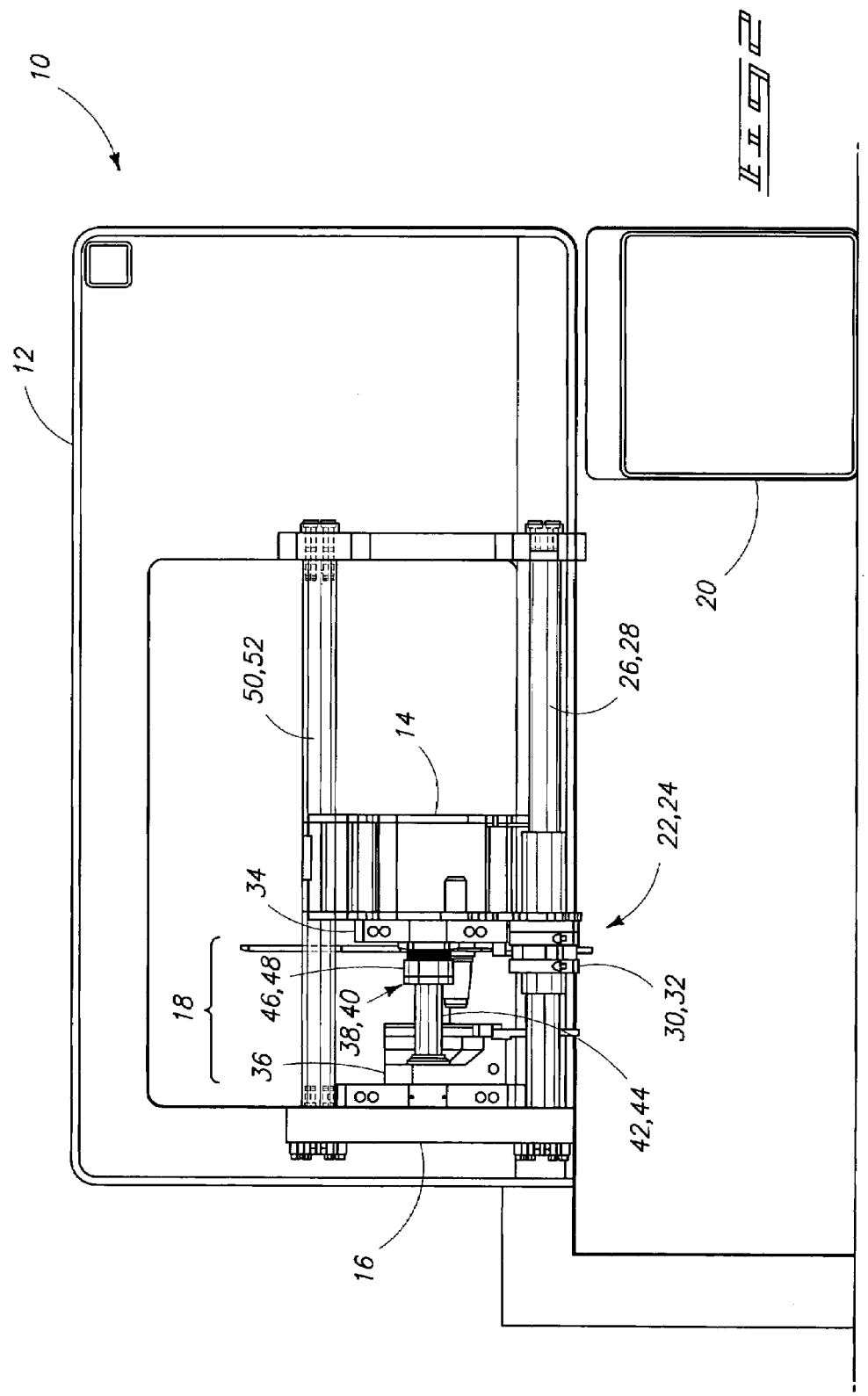
FIG. 2 is a vertical side view of the trim press of FIG. 1 and illustrates alignment features on a machine platen die post and a trim tool die post.

As shown in FIGS. 1 and 2, a pair of accessory guideposts 50 and 52 are also provided along moving platen 14. However, moving platen 14 does not mount onto guideposts 50 and 52. Instead, guideposts 50 and 52 serve to provide axial guide ways for accessory devices, such as a treadle or a part handling machine (not shown) that is associated with the trim press.

Figure 3:
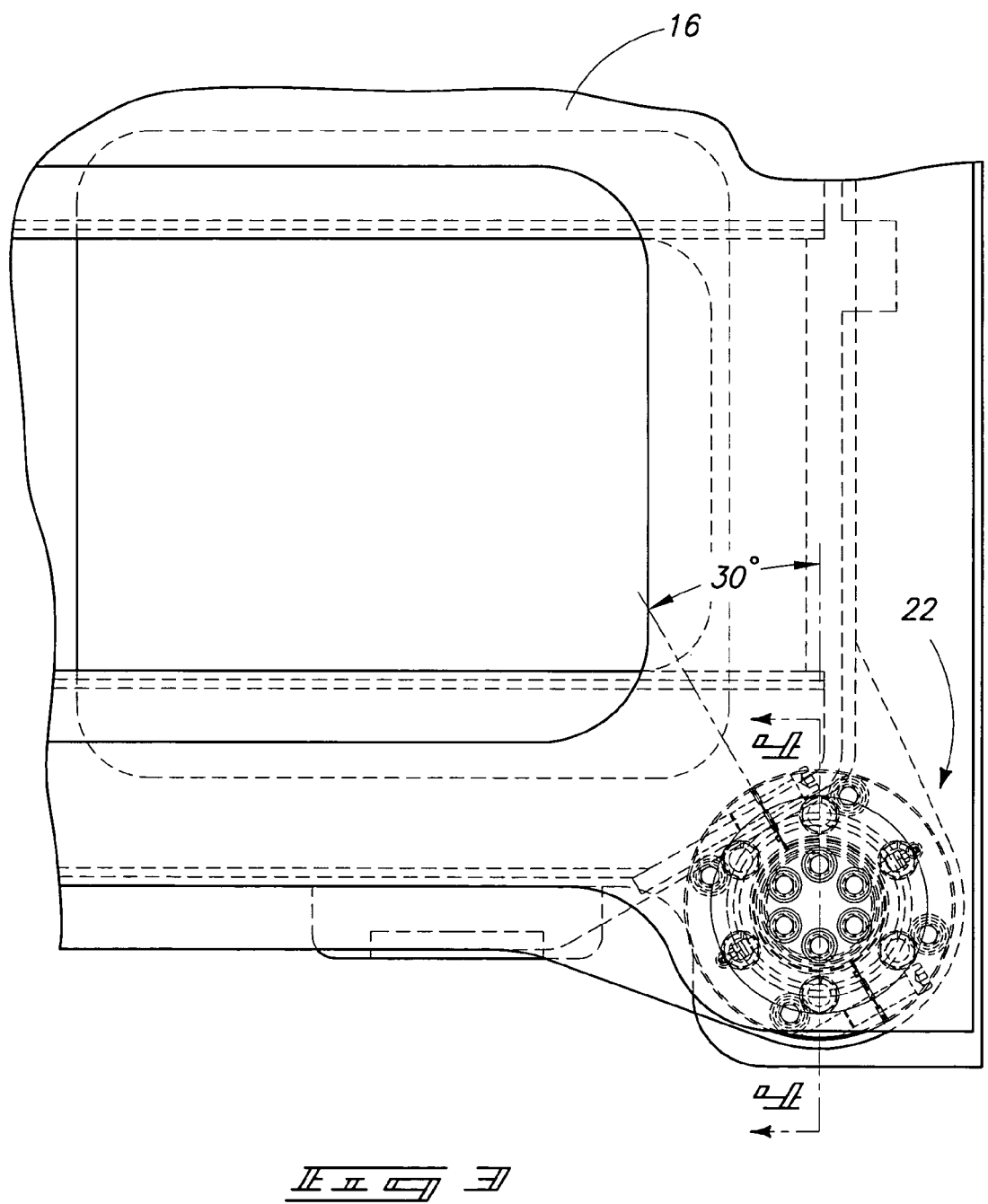
FIG. 3 is an end view for an alignment structure on a machine platen die post.

FIG. 3 illustrates an outer, left end view of stationary platen 16 coincident with tapered platen die post 26.

Figure 4:
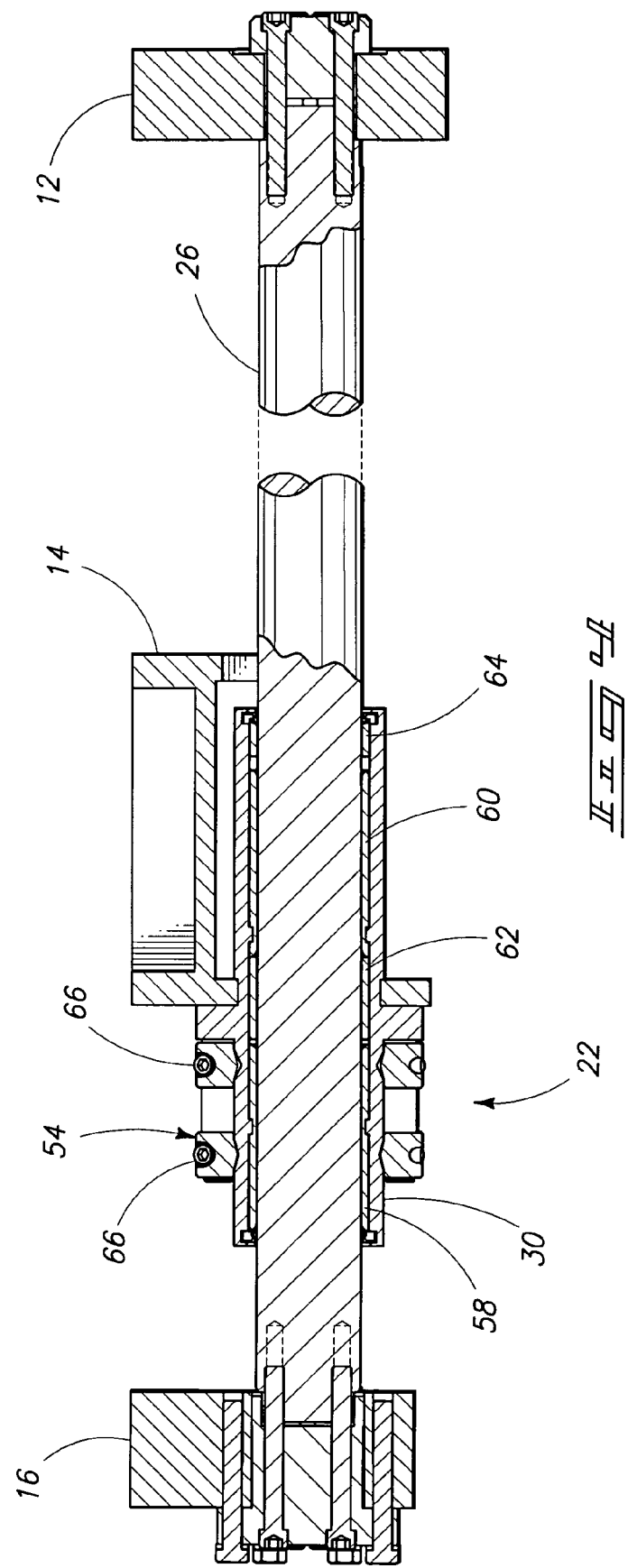
FIG. 4 is a centerline sectional view of the alignment structure for the machine platen die post of FIG. 3 taken along line 4—4 of FIG. 3.

FIG. 4 illustrates a vertical sectional view of the construction of platen die set 22. Platen die set 24 is similarly constructed. Platen die set 22 is mounted between stationary platen 16 and moving platen 14. Die post 26 is tapered to have a larger diameter on the left side and a smaller diameter on the right side. Adjustable bushing assembly 30 is formed from a right half shell 54 and a left half shell 56 that bolt together with a plurality of threaded fasteners 66 in regions that form a pair of clamp rings. Shells 54 and 56 leave a pair of end gaps when assembled together. One shell has clearance bores for the fasteners, while the other shell has a threaded bore that mates with the threaded fastener. A pair of bronze bushings 58 and 60 are provided spaced apart within bushing assembly 30. Each cylindrical bronze bushing 58 and 60 has an inner surface that is frustoconical and complements (or mates with) the tapered outer surface of tapered platen die post 26. A pair of cylindrical wicking washers (wool or felt) 62 and 64 are provided adjacent each bronze bushing 58 and 60, respectively, for holding lubricating oil that is dispensed along die post 26 during reciprocation of bushing assembly 30 therealong.

Figure 5:
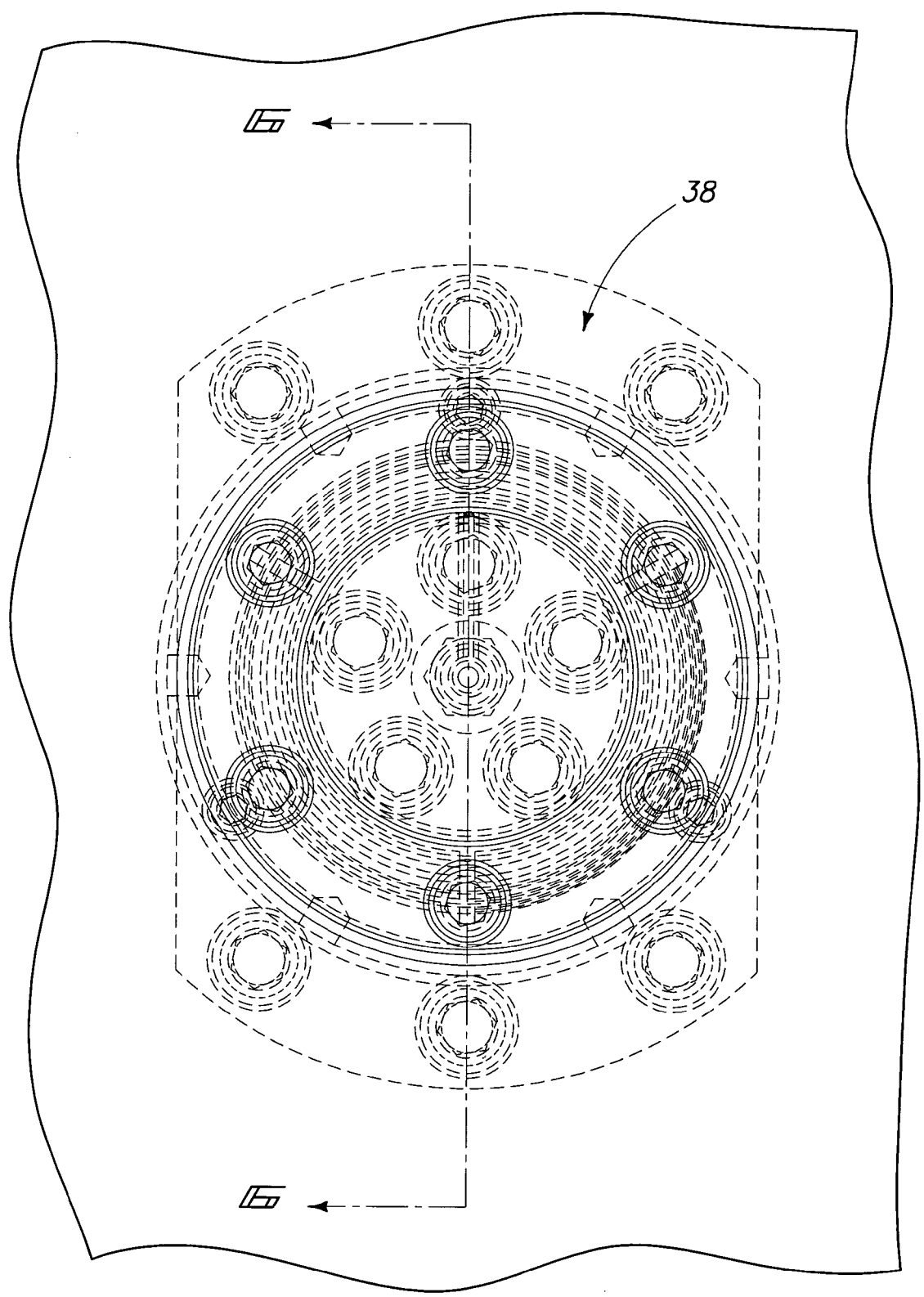
FIG. 5 is an end view of the alignment structure for use with the trim tool die posts of FIGS. 1–4.

FIG. 5 illustrates a left end view of female die plate 36 and corresponds with the trim tool die set 38.

Figure 6:
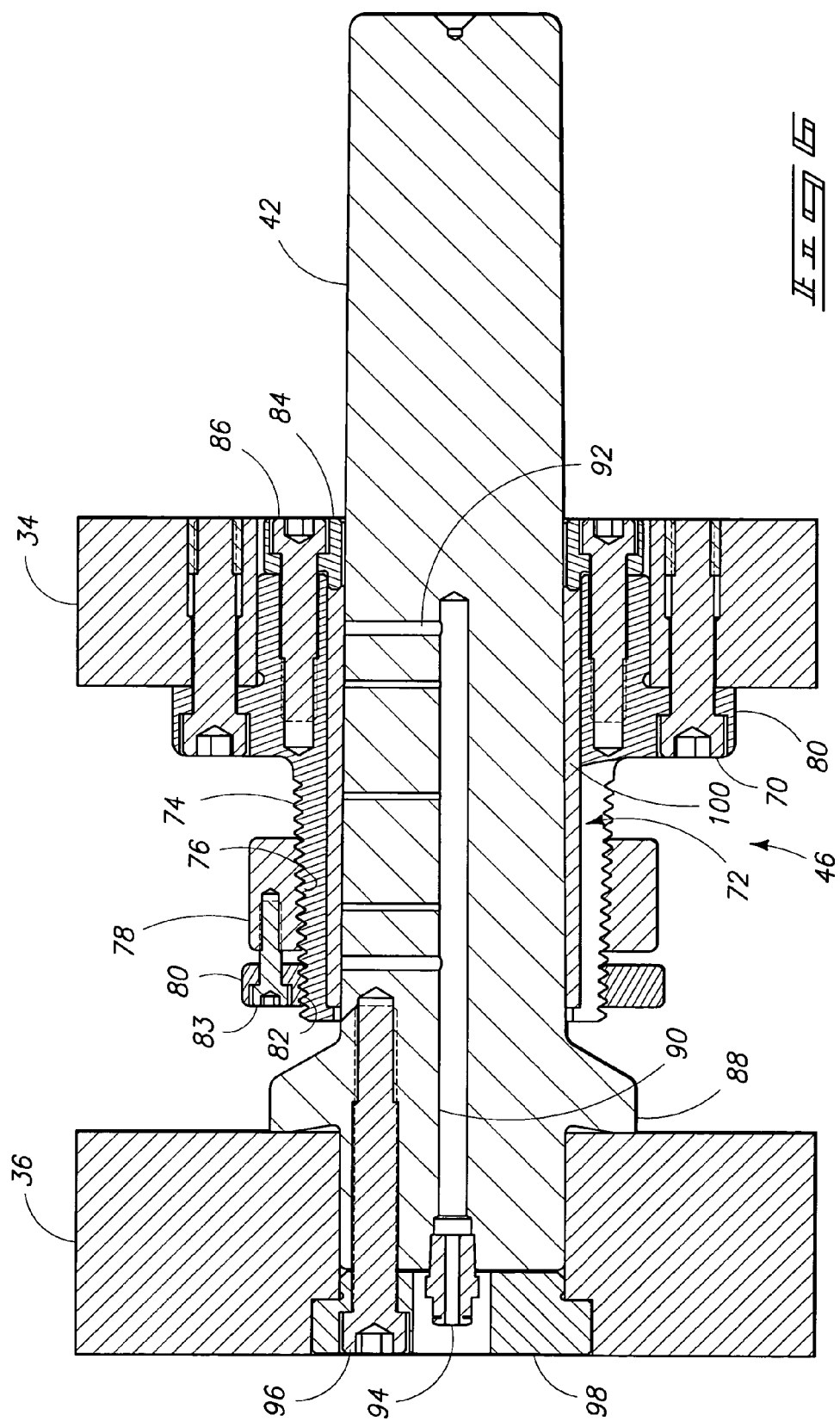
FIG. 6 is a vertical centerline sectional view of the one alternative construction alignment structure of FIG. 5 taken along lines 6—6 of FIG. 5.

FIG. 6 illustrates tapered trim tool die post 42 which is rigidly affixed at one end to female die plate 36. Tapered trim tool die post 42 has a larger diameter adjacent female die plate 36, and tapers towards a reduced diameter in a direction towards male punch plate 34. Die post 42 reciprocates within adjustable bushing assembly 46.

Adjustable bushing assembly 46 includes a tapered bushing housing 68 that is affixed to plate 34 via a plurality of cap screw fasteners 70. Housing 68 includes a tapered male threaded portion 74 that includes a plurality of axial slots 72. A tapered lock nut 78 is then tightened onto tapered male threaded portion 74 via tapered female threads 76 of nut 78. By advancing nut 78 onto thread 74 and towards plate 34, axial slots 72 accommodate compression on an inner surface of tapered male threaded portion 74 which compresses a bronze bushing 100 onto tapered die post 42. Bronze bushing 100 has an inner surface that is tapered so as to complement the opposite taper on die post 42. Bushing 100 can optionally have an axial slot to enhance compression. When plates 34 and 36 are brought to their closest position (during a trim operation), nut 78 is tightened onto thread 74 so as to compress bushing 100 radially about die post 42. Subsequently, a lock ring 80 is also threaded onto male tapered threaded portion 74 via female threads 82. Once lock ring 80 is threaded onto threaded portion 74, a plurality of fasteners 83 are engaged with lock nut 78 so as to lock the positioning of lock nut 78 onto male threaded portion 74.

A cap 84 is mounted onto tapered bushing housing 68 to entrap bronze bushing 100 radially therein via a plurality of threaded fasteners, such as cap screws 86.

Trim tool die post 42 also includes a radially outwardly extending shoulder 88 which engages with female die plate 36 when an end cap 98 is affixed thereto via a plurality of fasteners 96 (such as cap screws). A lubrication feed fitting 94 communicates with an axial lubricating feed port 90. Feed port 90 communicates with a plurality of radially extending ports 92. An oil lubrication line is then connected onto feed fitting 94 to deliver lubricating oil (or grease) via ports 90 and 92 to outer surfaces of trim tool die post 42 to lubricate axial sliding movement between an inner surface of bronze bushing 100 and an outer surface of trim tool die post 42.

FIG. 7 illustrates in greater detail the construction of trim tool die set 38. Punch plate 34 and die plate 36 are shown in simplified form as a rectangle (with remaining portions omitted). Exploded view construction of trim tool die set 38 illustrates the components and assembly of tapered, bronze bushing 100 onto tapered trim tool die post 42. Tapered bushing housing 68 is affixed onto plate 34 using a plurality of threaded cap screw fasteners 70. Bronze bushing 100 is entrapped within tapered bushing housing 68 via a cap ring 84 and a plurality of threaded cap screw fasteners 86.

FIG. 8 illustrates in plan view the trim tool assembly 18. FIG. 9 illustrates the trim tool assembly 18 in side view. FIG. 10 illustrates trim tool assembly 18 taken along line 10—10 of FIG. 8.

Figure 11:
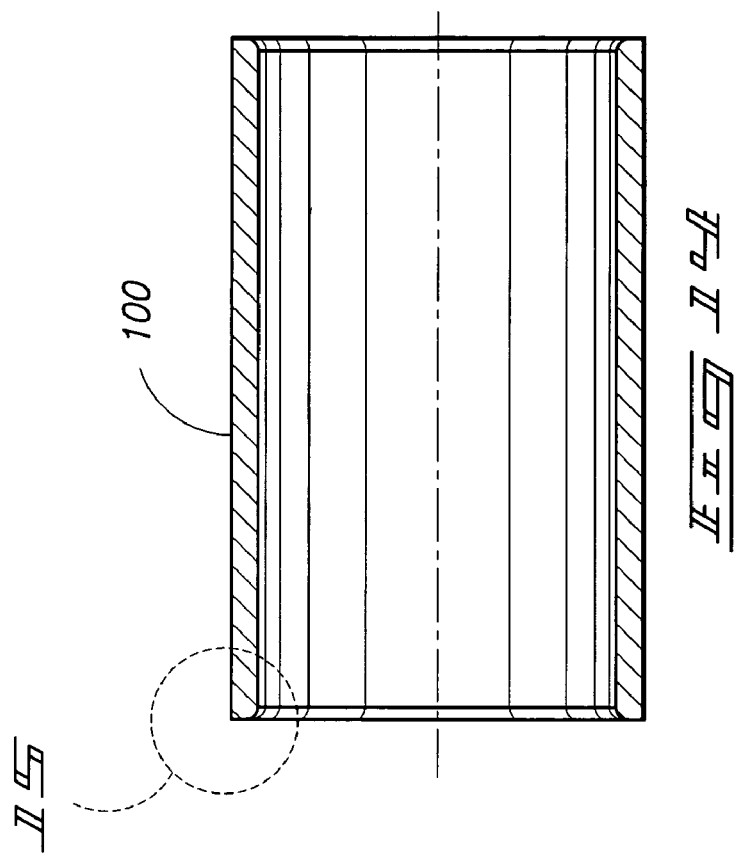
FIG. 11 is a vertical sectional view taken along line 11—11 of FIG. 8 illustrating configuration of the male and female cutting die components.

FIG. 11 illustrates a cross-sectional view of trim tool assembly 18 taken through line 11—11 of FIG. 8 corresponding with a cross-sectional view taken through a punch and die of punch plate 34 and die plate 36, respectively.

Figure 12:
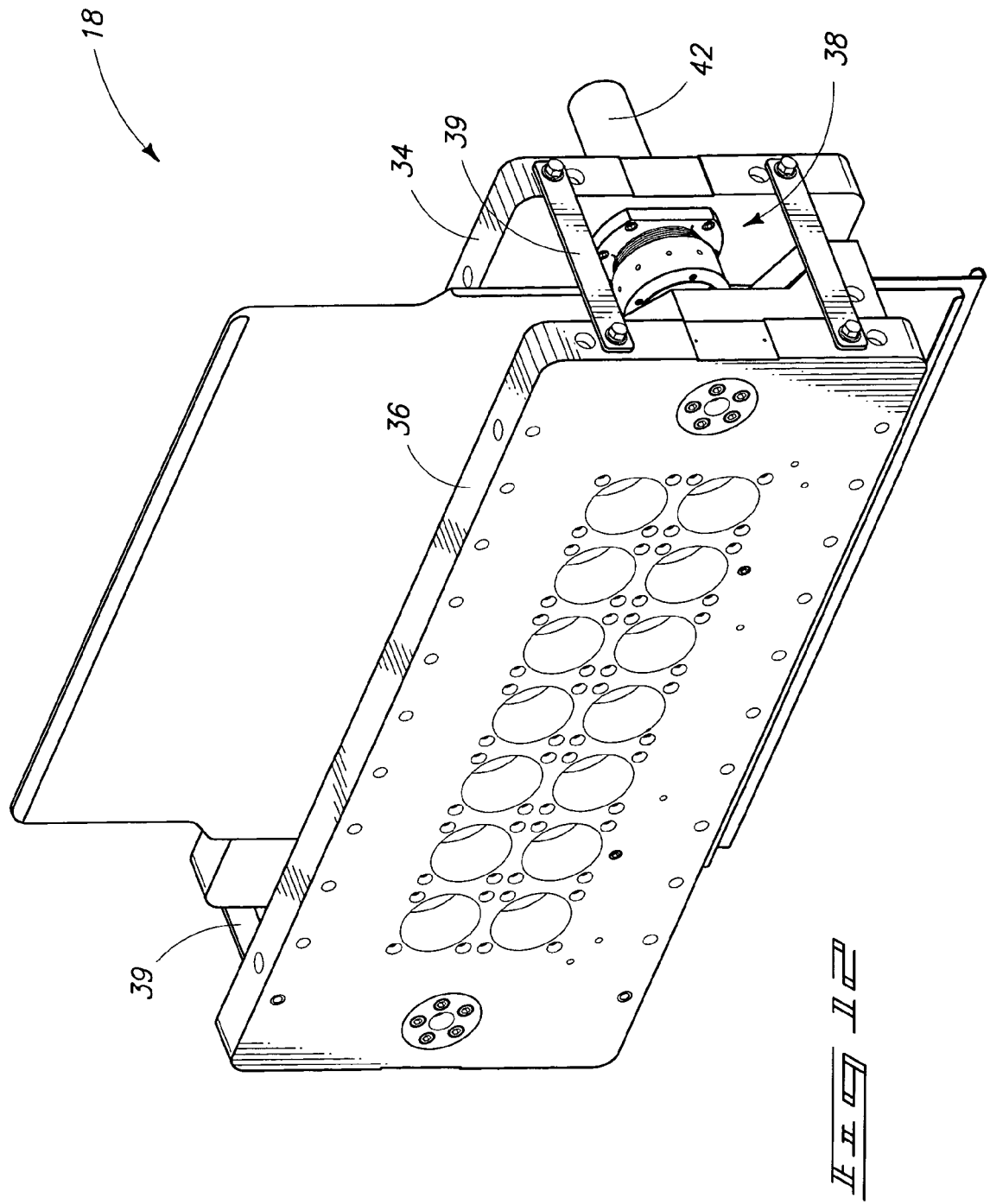
FIG. 12 is an isometric view of the trim tool die assembly of FIGS. 8 and 9.

FIG. 12 illustrates a perspective view of trim tool assembly 18 when plates 34 and 36 are brought together. More particularly, plates 34 and 36 are temporarily held together with a plurality of cross-members that are removably fastened on opposite ends of plates 34 and 36 to facilitate insertion and removal of trim tool assembly 18 between platens on a trim press.

FIG. 13 illustrates trim tool assembly 18 when plates 34 and 36 are at a maximally spaced-apart position during a trim operation. Such positioning corresponds with trim tool die sets 38 and 40 being positioned at the most tapered, or reduced diameter, position on each respective die post 42 and 44.

FIG. 14 illustrates a centerline sectional view of bronze bushing 100. An outer diameter of bronze bushing 100 is uniform. However, a rightmost inner diameter portion is smaller than the leftmost inner diameter portion of bronze bushing 100, corresponding with the inner diameter taper provided therein which complements the decreasing taper of the respective die posts extending from a leftmost position (larger diameter) to a rightmost position (smaller diameter).

Figure 15:
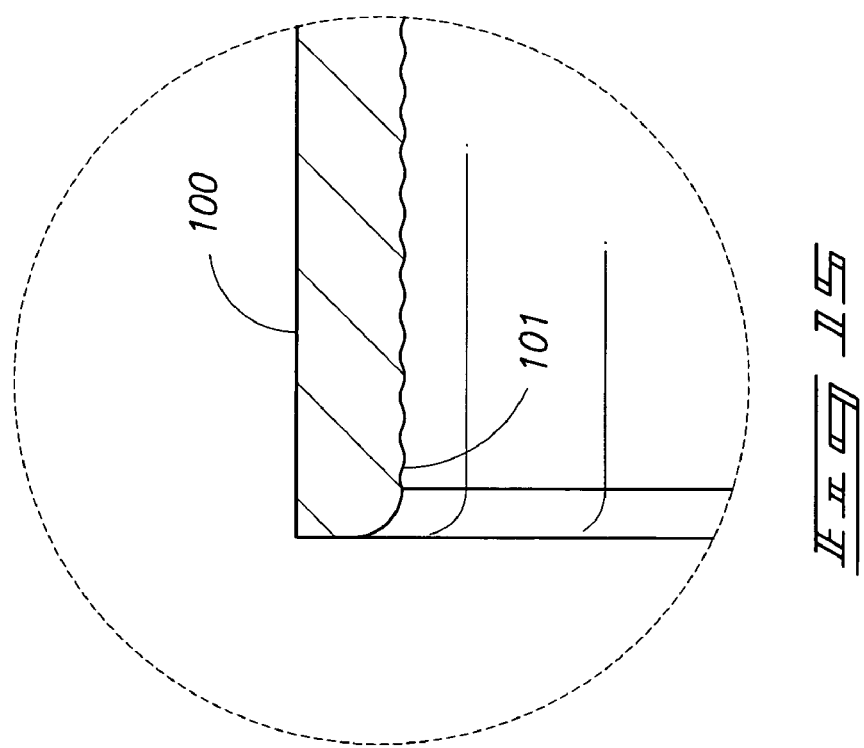
FIG. 15 is an enlarged view of the bronze bushing from the encircled region 15 of FIG. 14.

FIG. 15 illustrates an array of circumferential grooves 101 that are provided on an inner surface of bronze bushing 100 to facilitate conveyance and retention of lubricating fluid, or oil, along an inner surface of bronze bushing 100 as bronze bushing 100 axially travels across a respective tapered die post. Optionally, grooves 101 can have a helical shape, or they can be eliminated.

Figure 16:
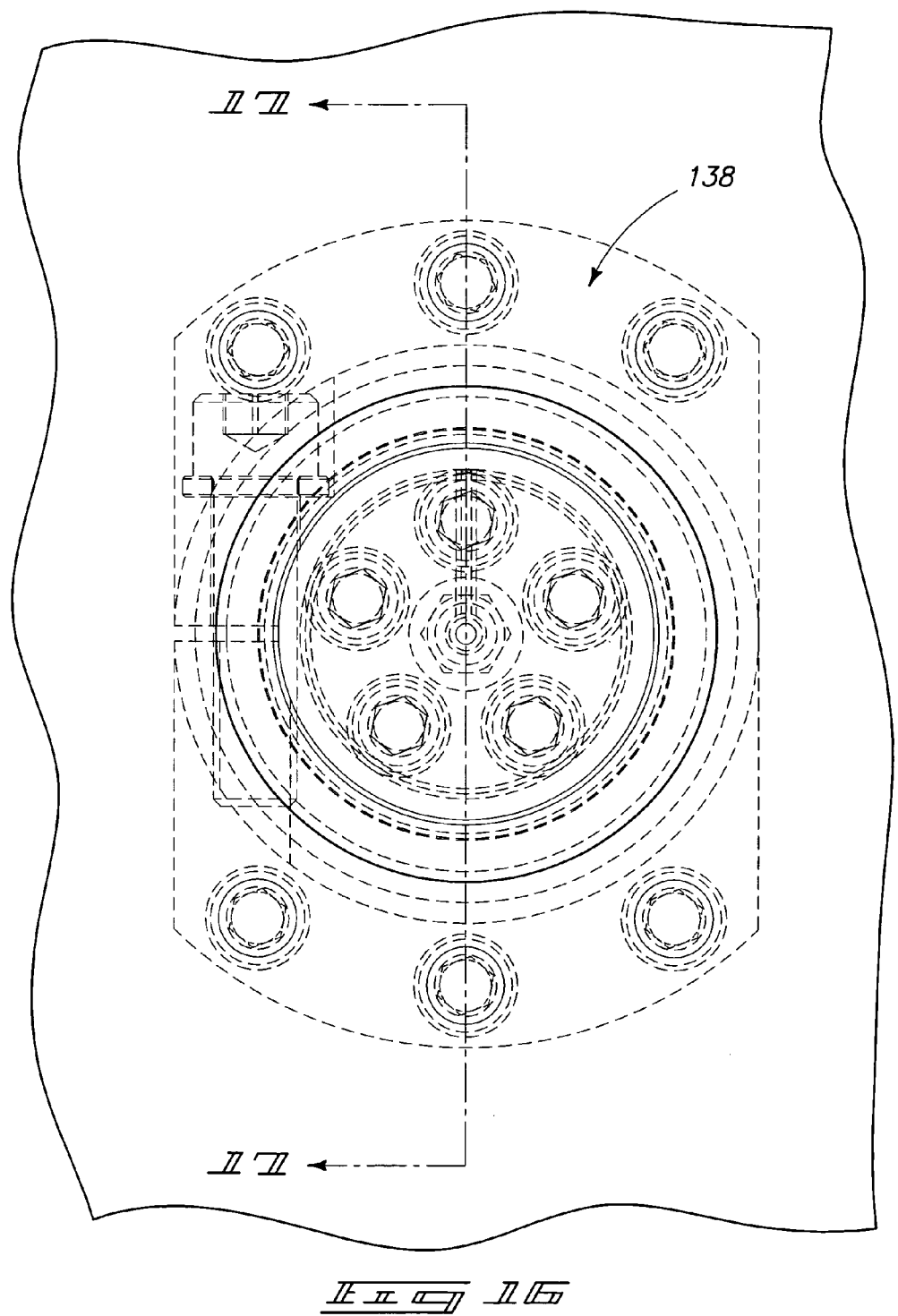
FIG. 16 is an end view of an alternative construction for an alignment structure for a trim tool die post corresponding with the view taken in FIG. 5.
Figure 17:
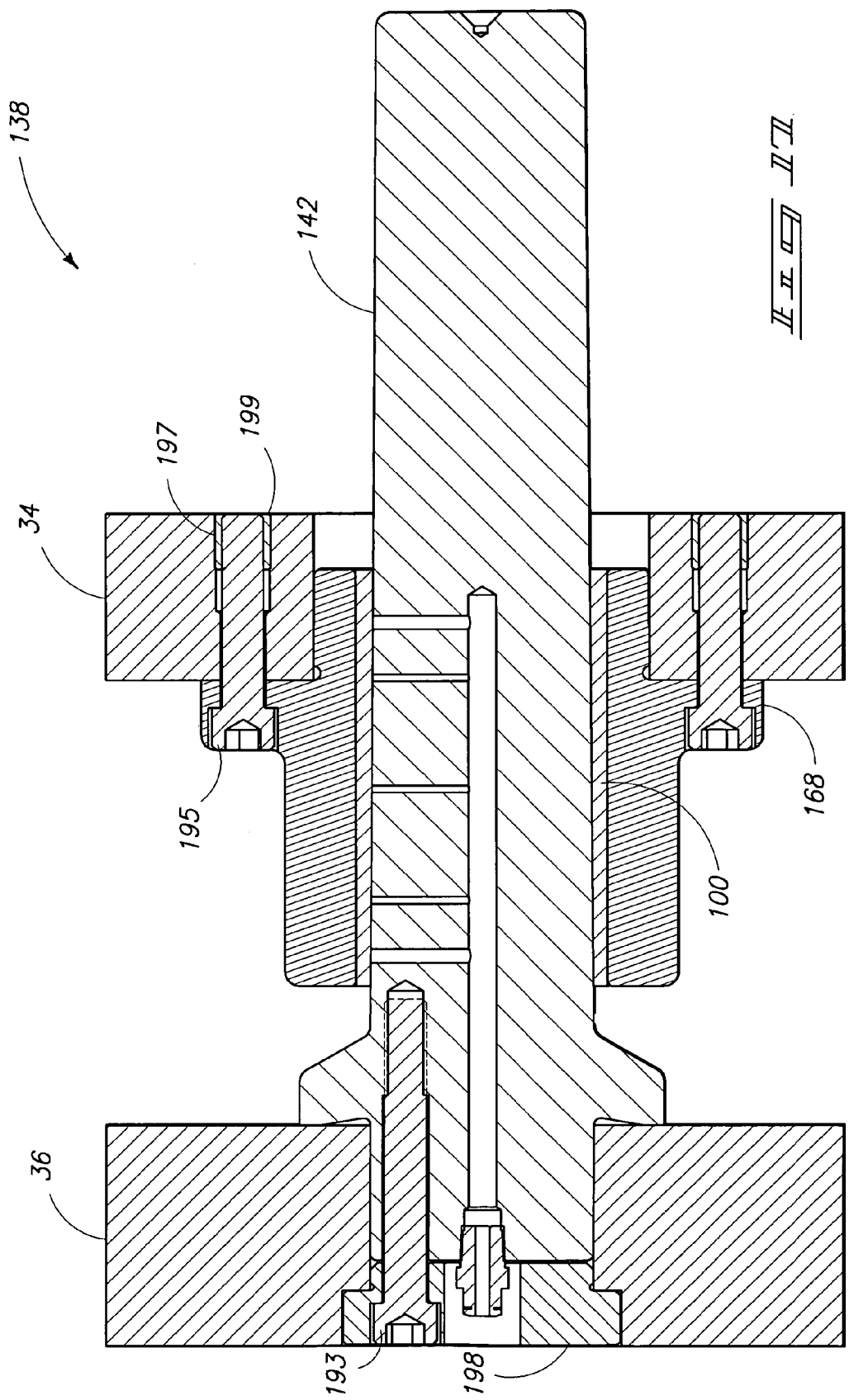
FIG. 17 is a vertical centerline sectional view of the alternative construction for an alignment structure of FIG. 16, corresponding with the view taken in FIG. 6.
Figure 18:
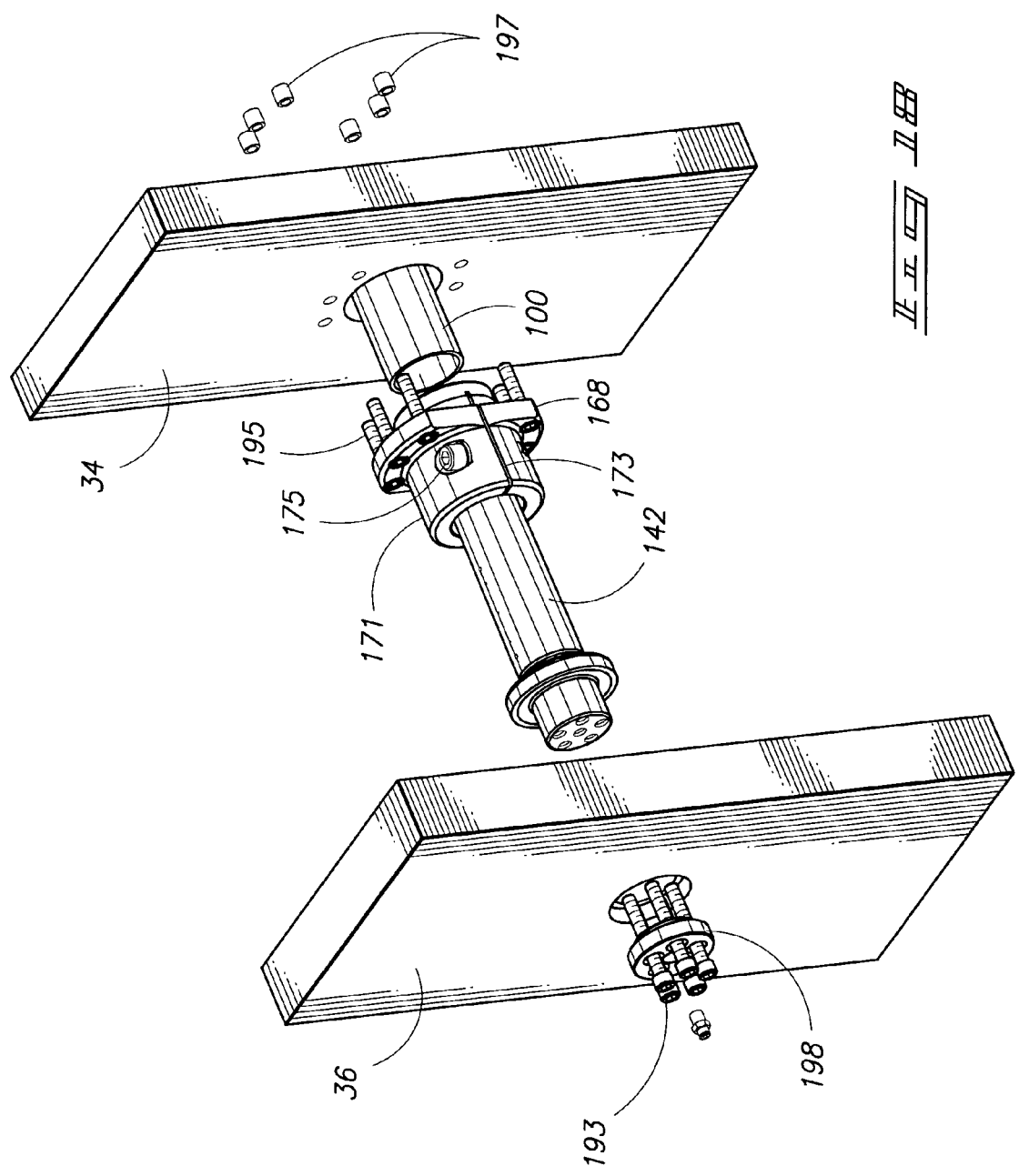
FIG. 18 is a partial exploded perspective view of the alternative construction for an alignment structure of FIGS. 16–17, corresponding with the view depicted in FIG. 7.

FIGS. 16–18 provide an alternative construction for a trim tool die set 38 of FIGS. 5–7. FIG. 16 illustrates a left end view of platen 16.

FIG. 17 illustrates an alternative construction of trim tool die set 138 similar to die set 38 of FIG. 6. However, a tapered bushing housing 168 differs in that bushing housing 168 has a longitudinal slot 173 provided in a circumferential body 171 (see FIG. 18). A threaded fastener 175 is used to compress housing 171 by threading fastener 175 into a threaded bore in housing 171 across slot 173 which closes slot 173 and clamps bronze bushing 100 onto tapered die post 142.

FIGS. 19–21 illustrate a second alternative construction for an alignment structure for a trim tool die set 238 similar to die set 138 in FIG. 17 and die set 38 in FIG. 6. More particularly, a tapered bushing housing 268 differs from tapered bushing housing 168 (of FIG. 17) in that bushing housing 268 has a longitudinal slot 273 that is adjusted in thickness (or gap size) by tightening and loosening a pair of threaded cap head screws 275 in order to compress a bronze bushing 200. By tightening threaded screws (or fasteners) 275, bushing housing 268 is provided with an aperture that is adjustably reduced in diameter so as to compress bushing 200 by decreasing the thickness of slot 273 in order to clamp bronze bushing 200 onto tapered die post 242. In response, bushing 200 deforms so as to adjust fit-up with guide post 242.

FIGS. 20 and 21 further illustrate the construction and assembly of bearing 200 within housing 268. An inner surface of bearing 200 has a tapered inner surface that mates in complementary and opposed relation with a corresponding tapered surface provided on an outer surface portion of tapered die post 242. Post 242 is affixed onto a female die plate 36 (see FIG. 19) via an end plate 298 using a plurality of threaded cap screws 293. Housing 268 is affixed onto a male punch plate 34 via a ring backing plate 299 having a radial slot 291 via a plurality of threaded fasteners 297. Additionally, a plurality of radially spaced-apart threaded fasteners 295 further secure housing 268 onto male punch plate 34.

Although the embodiments depicted in FIGS. 1–21 illustrate a lubrication system for delivering lubrication between a bearing and a guide post, such as a die post, it is understood that it is not necessary to deliver lubrication therebetween. For example, the bushing and/or the guide rod can be constructed of a relatively low friction material, such as by constructing the bushing from bronze material.

In the case where lubrication is used, one preferable lubrication comprises a oil which is delivered through a pressurized oil feed system between each bearing and guide rod. Alternatively, other lubrications can be utilized, such as grease, graphite, or other lubricating medium.

According to one construction, the collars or housings for each bushing assembly can be constructed from No. 836 standard steel, and the guide rods are constructed from pre-heat-treated 4130 steel that is induction hardened to approximately 60 Rockwell, and is then covered with a thin, dense chrome outer surface.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A thermoforming trim press, comprising:
a frame with a guide post including a tapered outer surface with increasing cross-sectional dimension toward a closing position;
a punch plate with a male cutting die;
a die plate with a female cutting die configured to scissor in intermeshing relation with the male cutting die; and
a bushing having a tapered inner surface complementary and reverse to the tapered outer surface on the guide post and adjustable in cross-sectional dimension and configured to guide one of the punch plate and the die plate for axial reciprocation along the guide post.

2. The thermoforming trim press of claim 1 wherein the bushing comprises a compressible bushing.

3. The thermoforming trim press of claim 2 further comprising a compression collar encompassing the bushing and configured to compress the tapered inner surface of the bushing.

4. The thermoforming trim press of claim 3 wherein the bushing comprises a bronze bushing.

5. The thermoforming trim press of claim 4 wherein the bushing comprises a plurality of circumferential grooves provided in the inner surface of the bushing.

6. The thermoforming trim press of claim 5 wherein the guide post comprises at least one lubrication feed port configured to delivery lubrication between the inner surface of the bushing and the outer surface of the guide post.

7. The thermoforming trim press of claim 6 wherein the at least one lubrication feed port comprises an axial lubrication feed port and at least one radially extending lubrication feed port communicating with the axial lubrication feed port.

8. The thermoforming trim press of claim 1 further comprising a housing having a circumferential body with a slot provided in the body, the housing configured to support the bushing, and at least one fastener configured to adjustably compress the body to decrease width of the slot in order to compress the bushing about the guide post.

9. The thermoforming trim press of claim 1 further comprising a housing configured to compress the bushing and adjust fit-up between the bushing and the guide post.

10. The thermoforming trim press of claim 9 wherein the housing comprises a pair of shells configured to mate together in complementary relation about the bushing and at least one fastener configured to draw together the shells to compress the bushing.

11. The thermoforming trim press of claim 10 wherein the housing comprises a tapered male thread portion, a plurality of axial slots provided in the tapered male thread portion, and a tapered lock nut having a tapered female thread portion configured to engage in complementary relation with the tapered male thread portion and adjustable with respect to the tapered male thread portion to compress the tapered male thread portion so as to compress the bushing contained therein.

12. The thermoforming trim press of claim 1 wherein the tapered outer surface of the guide post complements, in opposed relation, the tapered inner surface of the bushing.

13. The thermoforming trim press of claim 12 wherein the bushing comprises at least one axial slot configured to accommodate dimensional changes during compression of the bushing about the guide post.

14. A trim tool guide assembly for a thermoforming trim press, comprising:
a guide post having a forward-tapered outer circumferential dimension; and a bushing assembly with a bushing having a reverse-tapered inner circumferential dimension and an adjustable support collar for retaining the bushing and adjusting the inner circumferential dimension of the bushing relative to the outer circumferential dimension of the guide post.

15. The trim tool guide assembly of claim 14 wherein the bushing is made from a ductile material.

16. The trim tool guide assembly of claim 15 wherein the adjustable support collar is configured to compress the bushing in order to adjust the inner circumferential dimension of the bushing.

17. The trim tool guide assembly of claim 15 wherein the adjustable support collar comprises a tapered bushing housing having a threaded male portion, a cap ring having a threaded female portion complementary with the threaded male portion of the housing, and a plurality of fasteners configured to affix the cap ring onto the bushing housing.

18. The trim tool guide assembly of claim 15 wherein the bushing comprises a bronze bushing.

19. The trim tool guide assembly of claim 14 wherein the guide post comprises at least one lubrication feed port extending through the guide post to deliver lubrication to the circumferential dimension of the guide post.

20. The trim tool guide assembly of claim 19 wherein the at least one lubrication feed port comprises an axial feed port and at least one radial feed port communicating with the axial feed port to deliver lubrication to the circumferential dimension of the guide post.

21. The trim tool guide assembly of claim 20 wherein the bushing comprises an inner circumferential surface including an array of circumferential grooves provided therein for retaining lubrication.

22. The trim tool guide assembly of claim 21 wherein the bushing comprises a bronze bushing.

23. The trim tool guide assembly of claim 14 wherein the guide post comprises a frustoconical outer surface.

24. The trim tool guide assembly of claim 23 wherein the bushing comprises a frustoconical inner surface having an array of circumferential grooves provided therein.

25. A method for accurately severing an article from a web of thermoformed material using a thermoforming trim press, comprising:

providing a trim press with a guide post having a tapered outer surface that increases in cross-sectional dimension toward a closing position, a punch plate with a male cutting die, a die plate with a female cutting die configured to scissor with the male cutting die, and a bushing adjustable in cross-sectional dimension and having a tapered inner surface complementary and reverse to the tapered outer surface of the guide post;

positioning the male cutting die in intermeshing relation with the female cutting die proximate the closing position; and concurrent with positioning, adjusting cross-sectional dimension of the bushing to realize a desired accurate fit-up between the bushing and the guide post.

26. The method of claim 25 further comprising moving apart the punch plate and the die plate away from the closing position so as to reposition the bushing along the guide post away from the closing position so as to loosen fit-up between the bushing and the guide post.

27. The method of claim 26 wherein moving the bushing relative to the guide post into a position away from the closing position reduces friction between the bushing and the guide post during reciprocation between the bushing and the guide post while away from the closing position.

28. The method of claim 25 further comprising reciprocating the punch plate relative to the die plate between open and closed positions.

* * * * *

UNITED STATES PATENT AND TRADEMARK OFFICE
CERTIFICATE OF CORRECTION

PATENT NO. : 7,131,360 B2  Page 1 of 1
APPLICATION NO. : 11/055395
DATED : November 7, 2006
INVENTOR(S) : Jere F. Irwin It is certified that error appears in the above-identified patent and that said Letters Patent is hereby corrected as shown below:

Col. 8, line 27 -
Replace "configured to delivery lubrication between the inner surface"
With --configured to deliver lubrication between the inner surface--

Signed and Sealed this

Twenty-ninth Day of July, 2008

JON W. DUDAS
*Director of the United States Patent and Trademark Office*